United States Patent [19]

Ernest

[11] 4,071,259
[45] Jan. 31, 1978

[54] VEHICLE WHEEL SUSPENSION SYSTEM

[75] Inventor: David A. Ernest, Park Forest, Ill.

[73] Assignee: Allis-Chalmers Corporation, Milwaukee, Wis.

[21] Appl. No.: 690,541

[22] Filed: May 27, 1976

[51] Int. Cl.² .............................................. B60G 1/00
[52] U.S. Cl. .............................. 280/95 R; 280/112 A; 280/772
[58] Field of Search ................ 280/87 B, 112 A, 111, 280/95 R

[56] References Cited

U.S. PATENT DOCUMENTS

| 2,489,968 | 11/1949 | Lyon | 280/111 |
| 2,689,747 | 9/1954 | Kolbe | 280/112 A |
| 3,398,808 | 8/1968 | Heckenhauer | 280/111 X |

FOREIGN PATENT DOCUMENTS

| 1,191,743 | 10/1959 | France | 280/112 A |
| 643,333 | 9/1950 | United Kingdom | 280/112 A |

Primary Examiner—Joseph F. Peters, Jr.
Assistant Examiner—Donn McGiehan
Attorney, Agent, or Firm—Charles L. Schwab

[57] ABSTRACT

A pair of unsprung axle structures are pivotally connected to the rigid frame of a vehicle on a pair of laterally spaced longitudinally extending axes. These laterally spaced axes are at the approximate height of the vehicle wheels mounted on the axle structures and are spaced laterally inward from the wheels. At a lower height a transverse link is pivotally connected at its opposite ends to lower portions of the axle structures to form a tie bar therebetween. This suspension arrangement establishes an effective pivot or roll center for the end of the vehicle supported by the axle structures, which is at a higher elevation than the center of gravity of the vehicle. During operation, the wheels may traverse uneven ground while providing vehicle support; that is, one axle structure may swing upwardly as the other axle structure swings downwardly. By permitting the wheels to traverse uneven ground and yet provide support for the frame, the suspension system permits the full tread of the wheels to be utilized as a support base for the vehicle thereby providing excellent vehicle stability.

10 Claims, 8 Drawing Figures

VEHICLE WHEEL SUSPENSION SYSTEM

BACKGROUND OF THE INVENTION

Heretofore in lift truck construction, it has been the usual practice to provide an oscillating axle which is pivoted to the main frame of the vehicle on a longitudinal axis disposed in the longitudinal central plane of the vehicle. The axle is permitted to pivot to some limited extent about the longitudinal axis of its connection with the main frame of the vehicle; however, in order to provide lift truck stability, stops are provided to limit the amount of oscillation. In turning a corner or operating on a side slope with the prior design truck, it is possible to raise a wheel off the ground before the truck frame contacts the stop on the oscillating axle. This is not satisfactory because driving traction is lost when a drive wheel is lifted off the ground. This loss of traction makes direction control difficult. A vehicle with variable length banking links is shown in U.S. Pat. No. 2,689,747. In this prior art patent, the center of mass of the vehicle is below the roll center of the vehicle. However, the vehicle is permitted to tilt because of the spring suspension of the individual wheels.

BRIEF DESCRIPTION OF THE INVENTION

The suspension system or linkage for a pair of laterally spaced vehicle support wheels permits travel over uneven ground or roadway. The suspension linkage permits the wheels to walk over irregularities while all wheels remain on the ground, thus insuring proper support and traction. In addition to the compensation for irregular ground, which is an essential feature of wheel suspension in lift trucks and the like, the suspension system of this invention places the roll center above the center of gravity of the vehicle to effect a highly stable vehicle. The suspension of this invention does not utilize springs or other yieldable devices, thereby providing firm support for lift truck vehicles and the like.

In the illustrated embodiment of the present invention, a pair of axle structures are pivotally connected at their upper ends to the rigid main frame of the vehicle on a pair of laterally spaced longitudinal axes and a transverse link is pivotally connected at its opposite ends to lower inner portions of the axle structures. The axle structures carry wheel spindles on which support wheels are mounted. The wheel spindles may be parts of steerably supported stub axles pivotally connected to the main part of the axle structures. The steerable stub axles are interconnected by a steering linkage including steer arms rigidly secured to the stub axles and a tie rod interconnecting the steer arms. The steering may be effected by a double acting hydraulic jack interposed between one of the axle structures and the steering linkage.

DETAILED DESCRIPTION OF THE INVENTION

Figure 1:
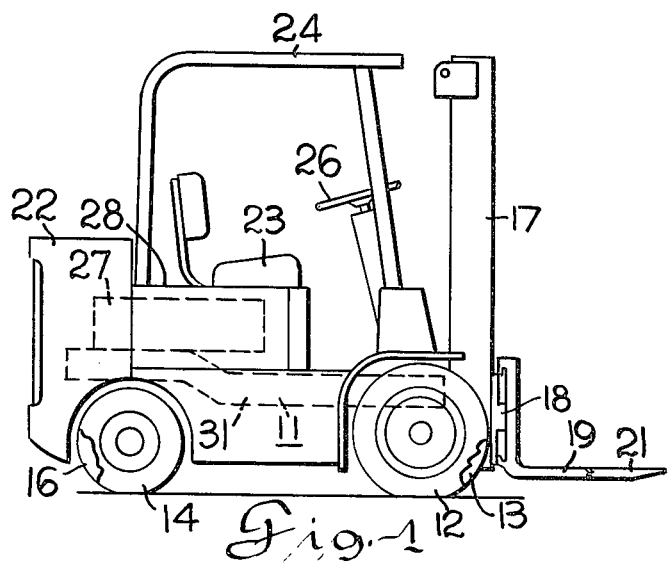
FIG. 1 is a side view of a lift truck.

Referring to FIG. 1, a front loading counterbalanced lift truck is illustrated in its unloaded condition. The lift truck includes a main frame 11 supported by a pair of front drive wheels 12, 13 and a pair of rear wheels 14, 16. A lift truck mast 17 is mounted on the front part of the frame 11 and supports an elevatable carriage 18 having a pair of forks 19, 21. A counterweight 22 is mounted on the rear of the frame 11 and an operator's station 23 is provided at a central location on the truck beneath an overhead guard 24 and adjacent the steering wheel 26. A source of power such as an internal combustion engine 27 is positioned beneath a hood or enclosure 28.

Figure 2:
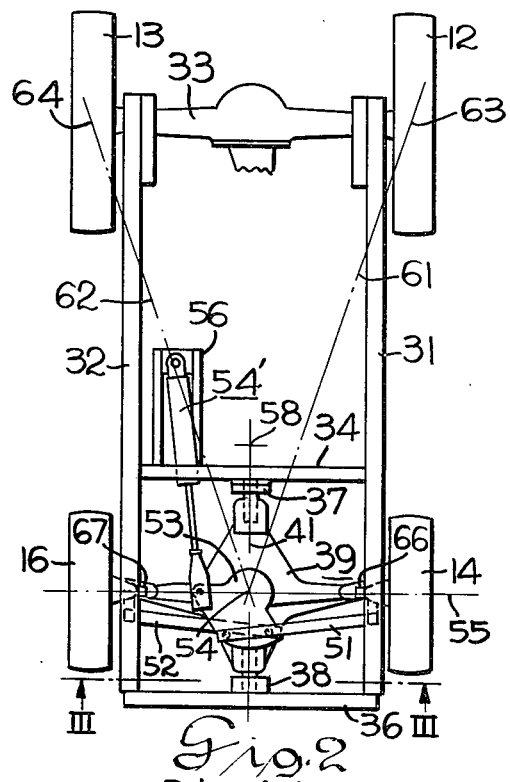
FIG. 2 is a top view of the undercarriage of the lift truck shown in FIG. 1 which employs an oscillating steer axle of prior art construction.
Figure 3:
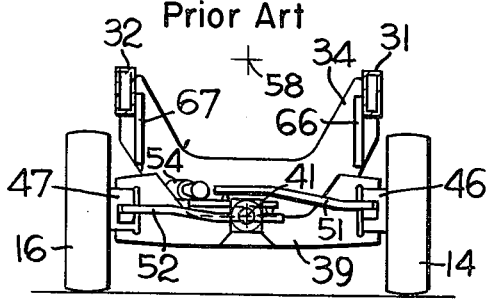
FIG. 3 is a section view taken along the line III—III in FIG. 2.

Referring to FIGS. 2 and 3 which show a prior art lift truck stripped to its undercarriage, the frame 11 of the vehicle includes a pair of longitudinally extending box section frame members 31, 32 which are rigidly connected to a drive axle 33 at their front ends. A pair of transverse frame members 34, 36 are rigidly connected at their laterally opposite ends to the frame members 31, 32 and carry bearing members 37, 38 on which longitudinally opposite ends of an oscillating axle structure 39 are pivotally connected on a longitudinal pivot axis 41. A pair of steerable stub axles 46, 47 are pivotally connected on vertical steer axes to laterally opposite ends of the axle structure 39 and include outwardly extending spindles on which the wheels 14, 16 are rotatably mounted. Rearwardly extending arms on the stub axles 46, 47 are pivotally connected to a pair of steering links 51, 52 which, in turn, have their laterally inner ends pivotally connected to a steering quadrant 53. The steering quadrant is pivotally connected to the axle structure 39 on a vertical axis 54 which passes through the junction of longitudinal axis 41 and the transverse vertical plane 55 through the vertical steer axes of the stub axles 46, 47. The steering quadrant 53 is operated by a double acting hydraulic jack 54' having its cylinder end pivotally connected to a support member 56 rigidly secured to the transverse frame member 34. The rod end of the double acting hydraulic jack 54' is pivotally connected to the steering quadrant 53. The center of gravity of the vehicle is at a point 58 which is well above the triangular support platform defined by broken lines 61, 62 extending from a point on the axis 41 intersected by the transverse vertical plane 55 and to points 63, 64 at the center of the support contact between the front wheels 12, 13 and the ground. If contrary to manufacturer's recommendations, a lift truck is operated on a lateral slope sufficiently steep to cause the center of gravity to move laterally outside of the support triangle defined by the lines 61, 62 and a transverse line between points 63, 64, the vehicle will tilt a small angle about either line 61 or 62 until one of the stops 66, 67 on the main frame is contacted by the axle structure 39.

Figure 4:
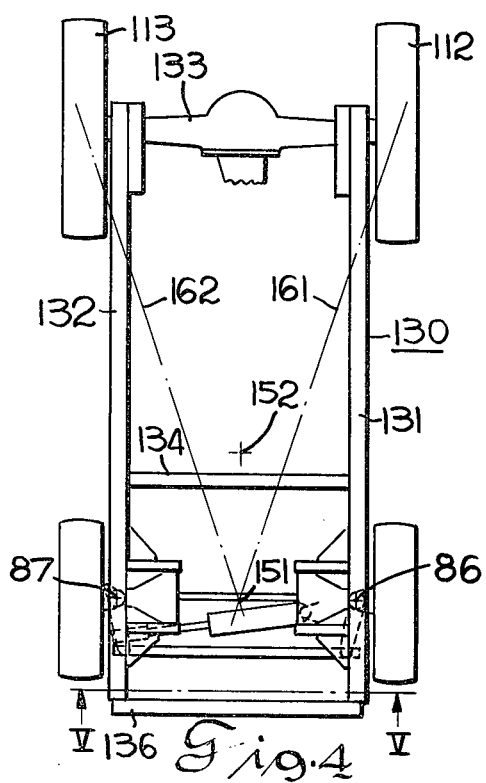
FIG. 4 is a top view of the undercarriage of a lift truck incorporating the present invention.
Figure 5:
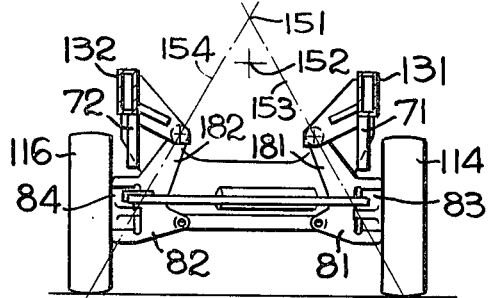
FIG. 5 is a section view taken along the line V—V in FIG. 4.

Referring to FIGS. 4 and 5, there is illustrated a stripped down undercarriage for a lift truck which incorporates the present invention. It should be understood that either the prior art undercarriage illustrated in FIGS. 2 and 3 or the chassis of the present invention illustrated in FIGS. 4 and 5 can be incorporated in the counterbalanced, front loading lift truck illustrated in FIG. 1. The main frame 130 of the undercarriage illustrated in FIGS. 4 and 5 includes a pair of longitudinally extending box section frame members 131, 132 which are rigidly connected at their front ends to laterally spaced portions of a drive axle 133 which supports drive wheels 112, 113 at its laterally opposite ends. This rigid connection of the axle 133 to the frame prevents relative vertical displacement of the wheels 112, 113 relative to the frame 130. The drive axle 133 is connected by an appropriate drive train to a suitable source of power such as the engine illustrated in FIG. 1. The frame members 131, 132 are rigidly interconnected by transverse frame members 134, 136. The rear wheels 114, 116 of the vehicle are supported by a unique suspension system including a pair of axle structures 81, 82 which include main parts 181, 182 and stub axles 83, 84 pivotally connected to the latter on vertical steer axes 86, 87.

Figure 6:
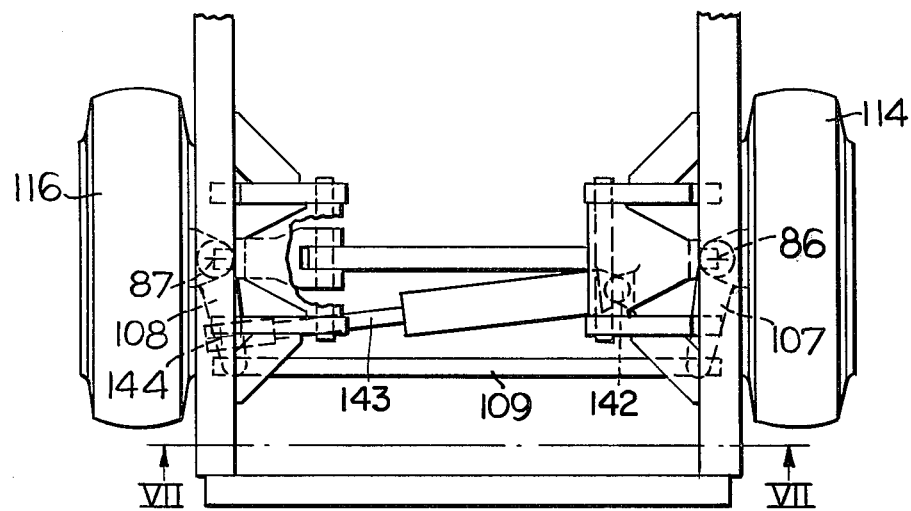
FIG. 6 is an enlarged top view of the suspension system shown in FIG. 4.
Figure 7:
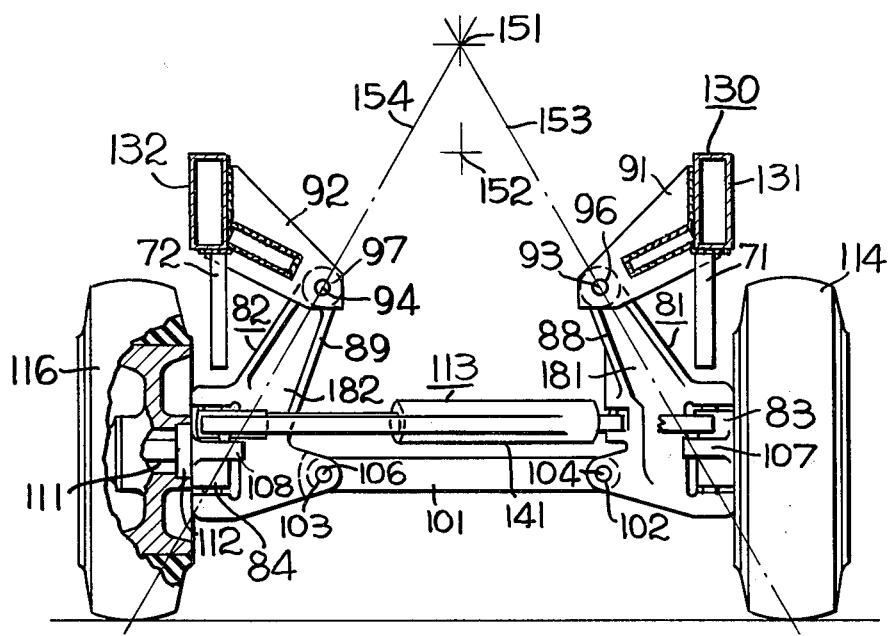
FIG. 7 is a section view taken along the line VII—VII in FIG. 6.
Figure 8:
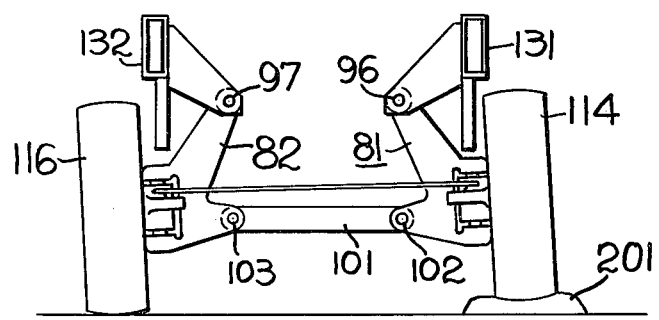
FIG. 8 is a view similar to FIG. 5 but showing the vehicle traversing uneven ground.

Referring also to FIGS. 6 and 7, upwardly extending arms 88, 89 of the axle structures 81, 82 have their upper ends pivotally connected by pins 96, 97 to brackets 91, 92 secured, as by welding, to the longitudinal frame members 131, 132 of the main frame 130 on longitudinal axes 93, 94 which are parallel and spaced laterally from one another. The lower, laterally inner portions of the axle structures 81, 82 are pivotally interconnected by a transversely extending link 101 by pins 102, 103 on laterally spaced pivot centers 104, 106, respectively. The pair of stub axles 83, 84 include rearwardly extending steer arms 107, 108 which are interconnected by a steering tie rod 109. As illustrated in FIG. 7, the stub axle 84 includes a spindle 111 on which the wheel 116 is rotatably mounted by a pair of axially spaced bearings one of which is indicated by the numeral 112. The other axle structure 81 is similarly constructed. Power means in the form of a double acting hydraulic jack 113 is provided to effect steering of the wheels 114, 116. The cylinder 141 of the jack 113 has its closed end pivotally connected to the axle structure 81 on a vertical axis 142. The rod 143 of the double acting hydraulic jack 113 has its free end pivotally connected to the arm 108 on a vertical axis 144. The vehicle is thus provided with steering means which includes a steering linkage comprising the steer arms 107, 108 and tie rod 109 and a hydraulic jack 113 interconnected between one of the main parts 181, 182 of axle structures 81, 82 and the steering linkage.

The roll center 151 for the vehicle of FIGS. 4-8 is disposed above the center of gravity 152 of the truck and is located at the intersection of a pair of broken lines 153, 154 passing through longitudinal axes 93, 94 and the center of ground contact of the wheels 114, 116. Thus, the vehicle or lift truck using the suspension system of this invention is much more stable than a vehicle or truck using the prior art suspension shown in FIGS. 2 and 3. The triangular support base for the vehicle using the present invention is defined by lines 161, 162 extending from point 151 to the centers of contact of wheels 112 and 113 with the ground. If contrary to the manufacturer's recommendations, the lift truck incorporating the present invention is operated on a side slope sufficiently steep to cause the frame to move relative to the axle structures 81, 82, one of the stops 71, 72 rigidly secured to the frame members 131, 132 will contact one of the axle structures 81, 82 to limit such movement.

The unsprung suspension system of this invention will permit traverse of uneven ground without loss of wheel contact within the limits permitted by the stops 71, 72. In traversing a raised area 201, the suspension system of the present invention would assume the position shown in FIG. 8.

The present invention is particularly advantageous in a lift truck, which needs a firm, broad support base for handling elevated loads. It is also desirable to provide a stable suspension system for a lift truck which minimizes overturning danger when the lift truck is operated without pay load on slopes steeper than recommended by the manufacturer. As is well understood by those engaged in lift truck operation, a lift truck can be overturned by turning a corner at too high a speed. The prior art suspension shown in FIGS. 2 and 3 will permit one of the drive wheels to raise off the ground as the frame of the truck pivots about the axis 41 of the axle structure 39 to an abutment with the axle structure through one of the stops 66, 67. As soon as the stop is contacted, the entire vehicle is supported on a new support triangle defined by the ground contact points of the three wheels remaining on the ground. In the present invention, all four wheels remain on the ground until an overturning condition of instability is reached, thus maintaining driving traction. This permits higher speed turning or a greater margin of safety at normal cornering speeds. The tilting of the vehicle about the longitudinal axis of the axle structure shown in FIGS. 2 and 3 with raising of one of the drive wheels from the ground not only is a frightening experience for the operator, which could lead to panic and errors in control judgment, but also results in loss of traction which detrimentally affects the operator's ability to bring the vehicle back under stable control.

The embodiments of the invention in which an exclusive property or privilege is claimed are defined as follows:

1. A vehicle comprising:
   a rigid longitudinally extending frame,
   a first pair of laterally spaced ground engaging support wheels for said frame,
   mounting means rotatably connecting said first pair of wheels to one longitudinal end of said frame at laterally opposite sides thereof, said mounting means preventing relative vertical displacement between said first pair of wheels and said frame,
   a pair of axle structures disposed at laterally opposite sides of the other end of said frame and having upper portions pivotally connected directly to said frame on a pair of laterally spaced longitudinal axes,
   a second pair of laterally spaced ground engaging wheels rotatably mounted, respectively, on the laterally outer portions of said axle structures for rotation about horizontal axes, said second pair of wheels being held against vertical displacement relative to said axle structures, and
   a transversely extending link pivotally connected at its opposite ends to the laterally inner portions of said axle structures, respectively, on a pair of laterally spaced pivot centers disposed below said pair of longitudinal axes.

2. The vehicle of claim 1 wherein planes passing through said pair of longitudinal axes and the centers of contact of said second pair of wheels with the ground intersect above the center of gravity of said vehicle.

3. The vehicle of claim 2 wherein each of said axle structures include a main part connected to said link and main frame and a stub axle steerably connected to said main part on a substantially vertical axis including a wheel supporting spindle rotatably mounting one of said second pair of wheels and further comprising steering means connected to said stub axles for effecting steering movement of the latter.

4. The vehicle of claim 3 wherein said steering means comprises a steering linkage including a steer arm extending longitudinally from each stub axle and a tie rod interconnecting said arms and a double acting hydraulic jack having its opposite ends connected, respectively, to said main part of one of said axle structures and to said steering linkage.

5. The vehicle of claim 1 wherein said pivot centers are spaced at least as far apart as said pair of longitudinal axes.

6. The vehicle of claim 5 wherein said pivot centers and said pair of longitudinal axes have approximately the same lateral spacing.

7. The vehicle of claim 1 wherein said longitudinal axes are disposed vertically above said pivot centers, respectively.

8. The vehicle of claim 1 wherein said pivot centers are lower than the axes of said second pair of wheels.

9. The vehicle of claim 1 wherein said longitudinal axes are laterally inward of said second pair of wheels.

10. The vehicle of claim 9 wherein said longitudinal axes are at the proximate height of said second pair of wheels.

* * * * *